Jan. 29, 1963

J. H. ADAMS 3,076,086

RESISTANCE WELDING APPARATUS

Filed Jan. 3, 1961

INVENTOR.
JAMES H. ADAMS
BY
Reuben Spencer
ATTORNEY

United States Patent Office 3,076,086
Patented Jan. 29, 1963

3,076,086
RESISTANCE WELDING APPARATUS
James H. Adams, Hillsdale, N.J.
(Fanton Hill Road, Weston, Conn.)
Filed Jan. 3, 1961, Ser. No. 80,103
5 Claims. (Cl. 219—78)

The present invention relates, in general, to resistance welding methods and apparatus and, in particular, to the resistance welding fabrication of metallic doors, metallic tubular assemblies or the like and to an improved mandrel assembly therefor.

Metallic doors are essentially sandwich structures comprising a pair of spaced sheetmetal skins welded to opposite sides of a suitable metallic core. Heretofore it has been necessary to separately weld each skin to the core since all attempts at the simultaneous welding of the skins to the core have resulted in inferior spot welds which did not take or which broke apart under relatively slight pressure.

Therefore, it is an object of the present invention to provide a resistance welding apparatus and method which overcome the disadvantages of the prior art.

It is another object of the present invention to provide an apparatus and method for simultaneously obtaining a pair of spaced spot welds which are of superior quality and which do not distort or discolor the work pieces.

It is a further object of the present invention to provide a highly novel and efficient mandrel assembly for an electric resistance welding apparatus, which mandrel is readily insertable between a pair of spaced skins and which provides adequate welding pressure to obtain a superior simultaneous pair of opposing spot welds.

It is a still further object of the present invention to provide a welding apparatus which prevents the distortion and discoloration of the work.

Other and further objects and advantages of the present invention will become readily apparent to one skilled in the art from reading the following specification in connection with the appended drawings.

In the drawings, which illustrate the best modes presently contemplated for carrying out the invention:

Figure 1:
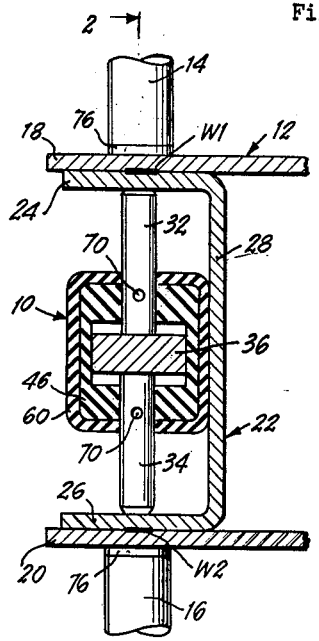
FIG. 1 is an elevation view, partly in section, illustrating the welding of a metallic door assembly pursuant to the present invention.
Figure 2:
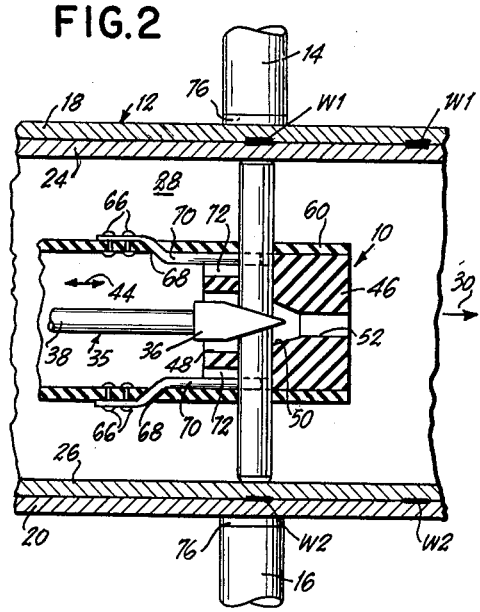
FIG. 2 is a sectional view taken on line 2—2 of FIG. 1.
Figure 3:
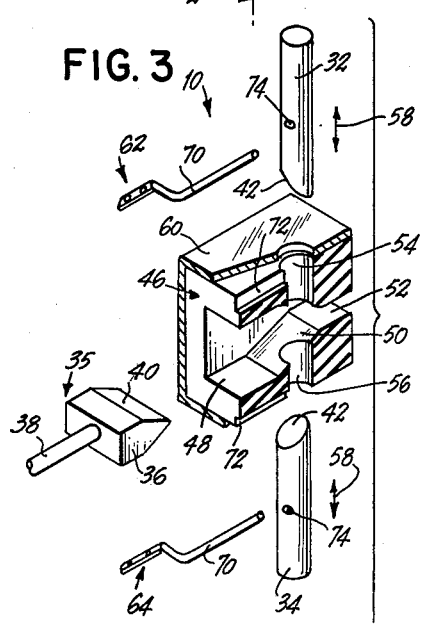
FIG. 3 is an exploded view of the welding mandrel assembly of the present invention.

Referring now to FIGS. 1-3 in detail there is shown a mandrel assembly 10, pursuant to the present invention, for obtaining simultaneous pairs of spaced spot welds in a hollow sandwish structure 12 by means of a conventional electric resistance welding apparatus provided with the cooperating welding electrodes 14 and 16. As here shown, the sandwich structure 12 comprises a metallic door assembly having as components the opposed outer metallic sheet metal skins 18 and 20 which are separated by one or more metallic core members 22 which are here shown as channels. Each channel member 22 has opposing flanges 24 and 26 separated by a web or bight 28. Pursuant to the present invention, each operation of the welding apparatus results in the simultaneous formation of a first spot weld W1 between skin 18 and flange 24 and an aligned second spot weld W2 between skin 20 and flange 26. After each welding operation, the structure 12 is moved stepwise in the direction of arrow 30 in FIG. 2, so as to provide a first line of laterally spaced spot welds W1 between skin 18 and flange 24 and a second line of laterally spaced spot welds W2 between skin 20 and flange 26. This results in the firm securement of the opposing skins to channel 22 along lines of spot welds which are full of discoloration or distortion.

In order to provide the simultaneous pairs of aligned spot welds W1 and W2, provision is made for the previously identified mandrel assembly 10. As here shown the mandrel assembly comprises a pair of mandrel elements 32 and 34, each formed of electrically conductive material such as copper or the like, which are urged apart, during the welding operation, to apply a desired welding pressure against flanges 24 and 26, in opposition to the welding electrodes 14 and 16, respectively. The mandrel elements are forced apart by a wedge 35 comprising a wedge head 36 and an operating shaft 38. The wedge head is tapered as at 40, for insertion between the mandrel elements. More specifically, the mandrel elements have sloping end surfaces 42—42 adapted to be engaged in sliding contact by the tapered end 40 of the wedge head. It will be understood that the wedge head is formed also of suitable electrically conductive material, such as copper or the like, and that suitable conventional means (not illustrated) are employed to drive shaft 38 in opposite directions, as shown by the arrow 44.

In order both to guide the wedge 35 and to mount the mandrel elements 32—34, provision is made for a rectangular guide or seat means 46 formed of suitable insulation material. The seat means is provided with surfaces 48—50—52 to receive and guide the wedge head 36 into its operative or seated position, fully inserted between the mandrel elements 32—34, as shown in FIGS. 1 and 2. The seat 46 is provided also with apertures 54 and 56 in which the mandrel elements 32 and 34, respectively, are mounted for slidable movement, as indicated by arrows 58. The seat 46 is mounted in position by means of a rectangular tubular member 60 formed of suitable electrical insulation material. It will be understood that the member 60 is suitably removably retained in position in the space between the opposing skins 18 and 20. The mandrel elements 32 and 34 are spring mounted within the apertures 54 and 56, respectively, by means of spring elements 62 and 64, respectively. More specifically, the spring elements are mounted in opposition on the outer surface of the tubular member 60, as by rivets 66 and extend through openings 68 defined in said member. Each spring has a rod-like shaft 70 which is free to move within a cut-out or groove 72 defined in the seat 46. The free end of each shaft 70 is inserted into an aperture 74 in the associated mandrel element.

It will be apparent that with the welding electrodes 14 and 16 withdrawn or retracted from the workpiece 12, and with the wedge 35 withdrawn or retracted from between the mandrel elements 32 and 34, the latter are biased by springs 62 and 64, respectively, out of engagement with the flanges 24 and 26, respectively. The workpiece 12 can now be readily moved relative to the welding electrodes and mandrel elements. When it is desired to form simultaneously a pair of spot welds W1 and W2, the wedge 35 is advanced toward its operative position inserted between the mandrel elements 32 and 34 to move the latter apart, against the spring bias, and into abutment with flanges 24 and 26, respectively, with the wedge providing for good welding pressure. The welding electrodes are brought into engagement with the skins 18 and 20, respectively, and the welding current has a continuous path from the negative electrode 14 through skin 18, flange 24, mandrel element 32, wedge head 36, mandrel element 34, flange 26 and skin 20 to the positive welding electrode 16 to provide for the simultaneous formation of the spot welds W1 and W2. At the termination of the welding operation, the welding electrodes and the wedge are all withdrawn or retracted to allow for movement of the work to another welding position.

Pursuant to a highly novel feature of the present invention, each welding electrode is provided with a special tip 76 formed of a suitable electrically conductive metal, such as, for example, aluminum. The aluminum tip is effective during the welding operation to prevent discoloration or distortion in the work 12.

Figure 4:
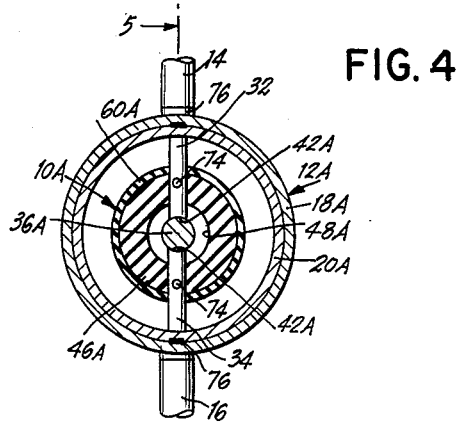
FIG. 4 is a view similar to FIG. 1 and illustrates the welding of a metallic tube assembly.
Figure 5:
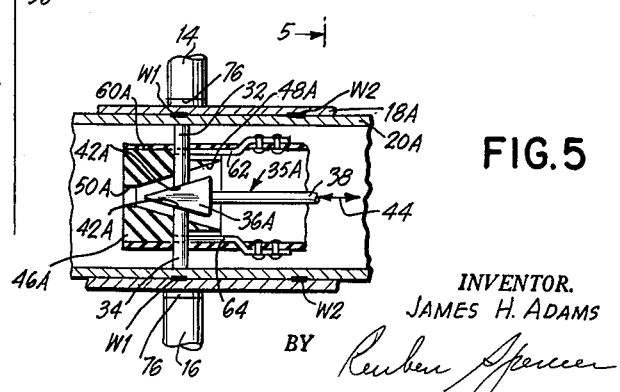
FIG. 5 is a sectional view taken on the line 5—5 of FIG. 4.

Referring now to FIGS. 4 and 5 in detail, there is shown a modification of the present invention pursuant to which the hollow structural work 12A which is to be spot welded comprises an outer circular tubular component member or skin 18A and an inner circular tubular component member or skin 20A.

In the present embodiment the circular tubular members 18A and 20A, which are formed of suitable electrically conductive material, are to be spot welded directly to each other in coaxial relation. The mandrel assembly 10A comprises the cooperating mandrel elements 32 and 34 which apply a welding pressure in opposition to the welding electrodes 14 and 16. Said mandrel elements are forced apart by the wedge 35A provided with a conical wedge head 36A and an operating shaft 38. The conical wedge head is insertable between the mandrel elements which have concave sloping end surfaces 42A—42A adapted to be engaged in sliding contact by the conical wedge head 36A. It will be understood that wedge head 36A is formed also of suitable electrically conductive material and this drive shaft 38 is reciprocable, as shown by arrows 44, by suitable conventional means.

In order both to guide the wedge 35A and to mount the mandrel elements 32—34, provision is made for a circular guide or seat means 46A formed of suitable insulation material. The seat means is provided with surfaces 48A—50A to receive and guide the wedge head 36A into its operative or seated position fully inserted between the mandrel elements 32 and 34, as shown. The seat 46A is provided also with the apertures 54 and 56 in which the mandrel elements 32 and 34, respectively, are mounted for slidable movement. The seat 46A is mounted in position by means of a circular tubular member 60A formed of suitable electrical material. It will be understood that member 60A is suitably removably retained in position within the inner tubular member 20A. The mandrel elements 32 and 34 are spring mounted, as previously described in connection with FIGS. 1–3, within the apertures 54 and 56 by means of the spring elements 62 and 64. The aluminum tipped welding electrodes 14 and 16 cooperate, as previously described, with the mandrel elements 32 and 34, as previously described, to form spot welds W1 between electrode 14 and mandrel element 32 simultaneously with the formation of spot welds W2 between electrode 16 and mandrel element 34 to secure together the coaxial tubes 18A and 20A.

While I have illustrated and described the presently preferred embodiments of my invention, it will be understood that changes may be made therein without, however, departing from the inventive concept embodied in the appended claims.

I claim:
1. A mandrel assembly for the resistance welding of the components of a hollow structure, said mandrel assembly comprising seat means formed of electrical insulation material and adapted for insertion within the hollow structure, a pair of electrically conductive mandrel elements mounted by said seat means, spring means yieldably retaining said elements in position in said seat means, and an electrically conductive wedge insertable between said elements for moving them toward the associated resistance welding electrodes against the bias of said spring means.

2. A mandrel assembly as in claim 1, said mandrel elements and said wedge being formed of copper.

3. A mandrel assembly as in claim 1, and a holder for said seat, said holder being formed of electrical insulation material and being insertable within the hollow structure.

4. A mandrel assembly for the resistance welding of the spaced metallic skins to the flanges of an interposed metallic channel core of a hollow door structure, said mandrel assembly comprising a rectangular tubular member insertable between said skins, a seat mounted by said tubular member between the opposed flanges of said channel core, said member and said seat being formed of electrical insulation material, a pair of spring loaded mandrel elements mounted by said seat, and a wedge insertable into said seat into a position between said mandrel elements to force them apart toward the adjacent flanges, said wedge and said elements being formed of electrically conductive material.

5. A mandrel assembly for the resistance welding of a pair of coaxial abutting metallic tubes, said mandrel assembly comprising a circular tubular member insertable within the inner tube, a seat mounted by said tubular member, said member and said seat being formed of electrical insulation material, a pair of spring loaded mandrel elements mounted by said seat, and a wedge insertable into said seat into a position between said mandrel elements to force them apart toward adjacent inner surface portions of the inner tube, said wedge and said elements being formed of electrically conductive material.

References Cited in the file of this patent
UNITED STATES PATENTS 2,057,017    Ganahl               Oct. 13, 1936

FOREIGN PATENTS 572,662    Germany             Mar. 20, 1933